United States Patent [19]

Arai et al.

[11] Patent Number: 4,492,581

[45] Date of Patent: Jan. 8, 1985

[54] GAMEBOARD TEACHING APPARATUS

[75] Inventors: Kazuo Arai; Takeshi Shimamoto, both of Hirakata, Japan

[73] Assignee: Matsushita Electric Industrial Co., Ltd., Osaka, Japan

[21] Appl. No.: 377,247

[22] Filed: May 11, 1982

[30] Foreign Application Priority Data

May 14, 1981 [JP] Japan .............................. 56-73054

[51] Int. Cl.³ .............................................. G09B 19/22
[52] U.S. Cl. .................................... 434/128; 273/238; 273/1 E; 340/323 R
[58] Field of Search ................ 434/128; 273/1 E, 237, 273/238, 148 R; 377/5; 340/323 R; 364/410

[56] References Cited

U.S. PATENT DOCUMENTS

| 3,654,392 | 4/1972 | Beinhocker et al. | 273/237 |
|---|---|---|---|
| 3,683,363 | 8/1972 | Khlebutin | 273/238 |
| 3,760,404 | 9/1973 | Khlebutin | 273/238 |
| 3,843,132 | 10/1974 | Ferguson | 273/238 |
| 3,888,491 | 6/1975 | Bernard et al. | 273/237 |
| 4,019,745 | 4/1977 | Mustelier | 273/237 |
| 4,037,067 | 2/1978 | Beach | 434/128 |
| 4,114,890 | 9/1978 | Yamamoto | 273/237 |
| 4,156,928 | 5/1979 | Inose | 273/237 |
| 4,372,558 | 2/1983 | Shimamoto et al. | 273/237 |
| 4,391,447 | 7/1983 | Dudley | 434/128 |

FOREIGN PATENT DOCUMENTS 53-79636 7/1978 Japan .................................. 434/128

Primary Examiner—Richard C. Pinkham
Assistant Examiner—Leo Picard
Attorney, Agent, or Firm—Wenderoth, Lind & Ponack

[57] ABSTRACT

A game apparatus enabling a person to learn the standard orders of development in or to solve a problem of the game of Go, shogi (Japanese chess), chess or the like. In the case of learning the standard orders of development in the game, this game apparatus detects and displays the move of a game piece, and in the case of the game problem, the game apparatus counts the number of error moves of the game piece and does not display the correct move of the game piece until the counted number of error moves of the game piece is greater than a predetermined value, and then displays the correct move of the game piece.

4 Claims, 8 Drawing Figures

4,492,581

GAMEBOARD TEACHING APPARATUS

BACKGROUND OF THE INVENTION

This invention relates to a game apparatus, especially to a board game apparatus enabling a person to enjoy boad games including Go, shogi (Japanese chess), chess and the like. More particularly, this invention relates to a board game apparatus enabling a person to learn the standard orders of development in the above-mentioned games or to solve problems of the above-mentioned games.

Usually, a person learns the standard orders of development in or problems of the game of Go, shogi, chess or the like by studying the special books related to the game. In this case, he or she places or moves the game pieces on the game board with reference to the special book. He or she has to compare the game piece arrangement on the actual game board with that of the drawing of the book in every placement or movement of the game piece. These are hard and troublesome tasks.

SUMMARY OF THE INVENTION

An object of the present invention is to provide a game apparatus enabling a person to learn the standard orders of developments in a board game without reference to the special books of the game.

Another object of the present invention is to provide a game apparatus enabling a person to further enjoy solving problems of a board game without reference to the special books of the game.

These and other objects of the present invention can be accomplished by a game apparatus comprising:
a game board on which a player plays a game;
game pieces for the game;
a memory means for storing coded data of orders of development of the game or problems of the game;
a game piece detecting means for detecting a position of a game piece on the game board and for providing a detected signal;
a display means for displaying the next move of the game piece;
a control means for controlling said display means to display according to said coded data stored in said memory means when said detecting means detects a move of the game piece.

BRIEF DESCRIPTION OF THE DRAWINGS

Hereinafter, the present invention will be detailedly described with reference to the accompanying drawings in which.

DESCRIPTION OF THE PREFERRED EMBODIMENTS

Embodiments of the game apparatus according to the present invention described hereafter are for learning Go, but they are merely by way of examples. The game apparatus can be modified for learning the other board games.

Figure 1:
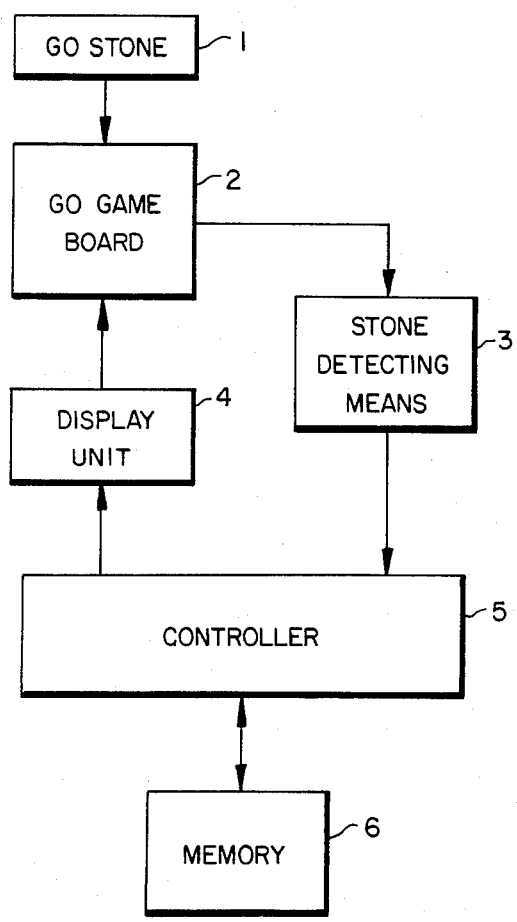
FIG. 1 is a block diagram of an embodiment of a game apparatus according to the present invention.

FIG. 1 is a block diagram of a game apparatus according to the present invention. In FIG. 1, element 1 is a Go stone used as a game piece; element 2 is a Go game board; element 3 is a stone detecting means for detecting the position at which the Go stone 1 is placed; element 4 is a display unit for indicating a position to place the Go stone 1; element 5 is a controller for controlling the operation of the game apparatus, and element 6 is a memory means for storing data of the standard orders of development in the game of Go or of examples of development in the same.

Figure 2:
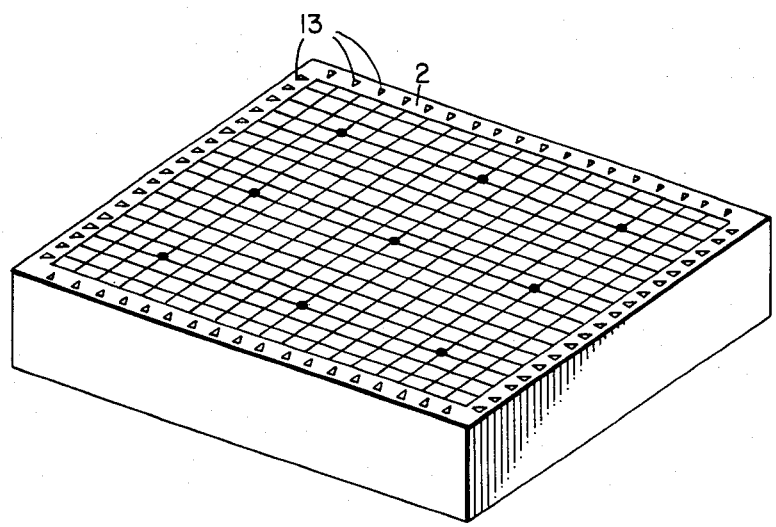
FIG. 2 is a pictorial view of an embodiment of a Go game board according to the present invention.
Figure 3:
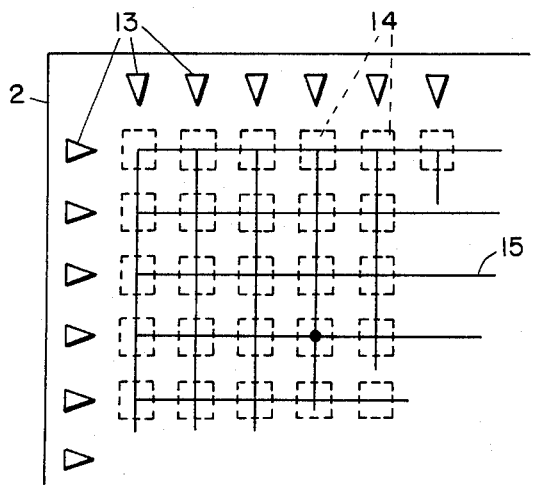
FIG. 3 is a partial view of the Go game board in FIG. 2.

FIG. 2 is a pictorial view of the Go game board 2 and FIG. 3 is a partial view of the Go game board 2 shown in FIG. 2.

Referring to FIGS. 2 and 3, the Go game board is a 19 by 19 board divided by 19 horizontal lines and 19 vertical lines, so that there are 361 intersection points on the grid. On each end of the board 2, 19 LEDs 13 are provided corresponding to the 19 lines, so that 19×4 LEDs are provided on the periphery of the board 2. The LED 13 is an example of the display unit 4 in FIG. 1. Beneath each intersection point, a stone sensor 14 is provided. The stone sensor 14 is a part of the stone detecting means 3, and detects the Go stone 1 when it is placed at the corresponding intersection point.

The controller 5 accesses the memory 6 and reads out a coded data word corresponding to a position on the Go game board 2, and drives the display unit 4 to indicate the position according to the coded data read out from the memory 6. A player can see the displayed position so that he can place the Go stone 1 at the same position. When the Go stone 1 is placed at one of the intersection points, the corresponding stone sensor 14 detects the position and sends a signal for informing the position to the controller 5. Then, the controller 5 increases the address of the memory 6 so as to read out the next coded data for indicating the next position for placing the next Go stone. In the way roughly described above, the player can learn the standard orders of developments in Go or enjoy solving Go problems.

Hereinafter, the more detailed description of the embodiment of the present invention will be made.

Figure 4:
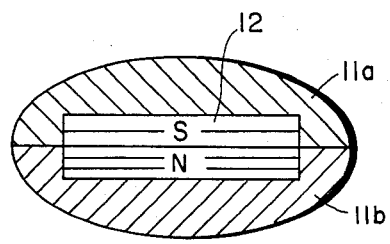
FIG. 4 is a cross-sectional view of a Go stone as a game piece used for the Go game board in FIG. 2.

FIG. 4 is a cross-sectional view of an example of the Go stone 1. The Go stone 1 is composed of three parts: namely, plastic covers 11a and 11b and a permanent magnet 12 covered by the plastic covers 11a and 11b.

Figure 5:
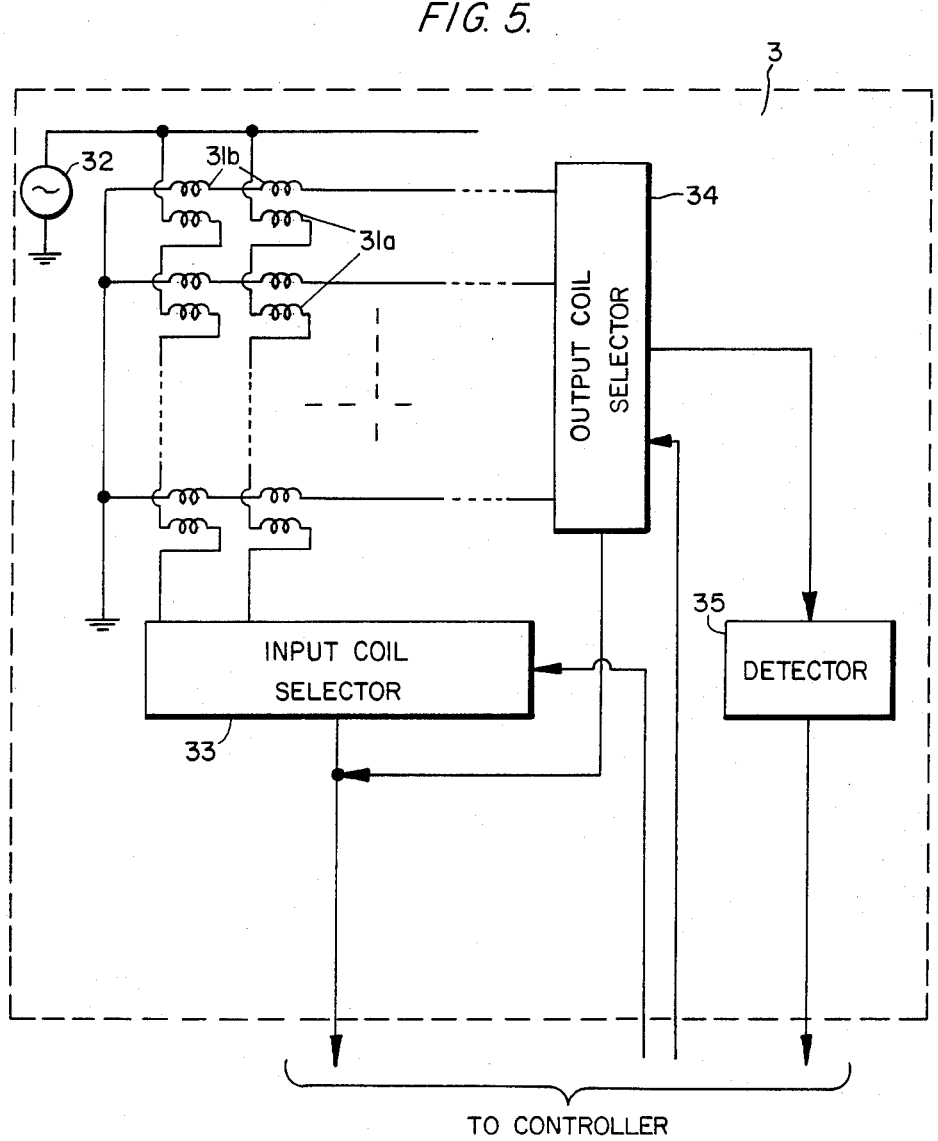
FIG. 5 is a schematic block diagram of an embodiment of a stone detecting means according to the present invention.

FIG. 5 is a block diagram of an embodiment of the stone detecting means 3 which contains 361 stone sensors 14. The stone sensor 14 is composed of a saturable ferrite core (not indicated), an input coil 31a and an output coil 31b, the coils 31a and 31b being wound around the ferrite core. As seen from FIG. 5, the input coils 31a are connected in series along the vertical lines of the Go game board 2 so that 19 separate series circuits of the input coils are formed, each of the series circuits having 19 input coils. One end of each of the series circuits of the input coils are connected in common and the commonly connected point is supplied with an output signal from an oscillator 32. The other ends of each of the series circuits of the input coils are respectively connected to an input coil selector 33. The output coils 31b are connected in series along the horizontal lines of the Go game board 2 so that 19 separate series circuits of the output coils are formed, each of the series circuits having 19 output coils. One end of each of the series circuits of the output coils are connected in common and the commonly connected point is grounded. The other ends of each of the series circuits of the output coils are connected to an output coil selector 34. The input coil selector 33 and the output coil selector 34 are respectively driven by signal from the controller 5 so as to respectively scan the series circuits of the input coils and the series circuits of the output coils, thereby respectively enabling the input coils 31a and the output coils 31b.

An output signal from the selected output coil 31b is supplied to a detector 35 and converted to a digital signal. For example, if there is no Go stone on the selected intersection point on the Go game board 2, the ferrite core does not saturate and the output signal of the output coil 31b has a large amplitude. However, if the Go stone is placed on the selected intersection on the Go board 2, the ferrite core saturates and the output signal of the output coil 31b has a very small amplitude. And then, the detector 35 detects the amplitude of the output signal of the output coil selector 34 and outputs a digital signal, i.e. if there is a Go stone on the selected intersection point, the detector 35 outputs a high level DC voltage and if no stone is present, the detector 35 outputs a low level DC voltage.

Figure 6:
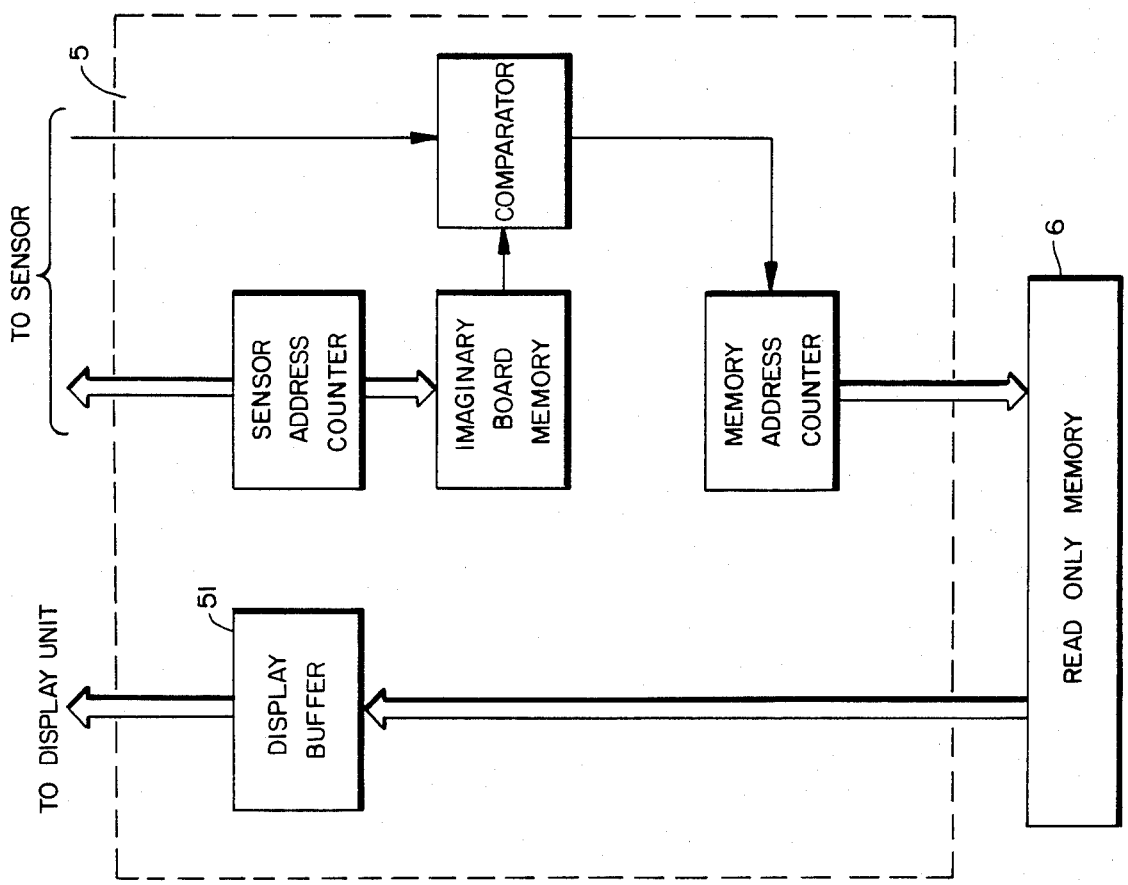
FIG. 6 is a block diagram of an embodiment of a controller and a memory means according to the present invention.

FIG. 6 shows a block diagram of an example of the controller 5 and the memory 6. The memory 6 is a read only memory (ROM) which stores coded data of the standard orders of development or a record for solving problems of the game. The controller 5 mainly comprises a display buffer 51, a sensor address counter 52, an imaginary board memory 53, a comparator 54, and a memory address counter 55. In FIG. 6, the display buffer 51 drives the LED 13 so as to light in accordance with the coded data from the read only memory 6, and the sensor address counter 52 provide outputs to the input coil selector 33 and output coil selector 34. The digital output signal from the stone detecting means 3, corresponding to the placed Go stone position, is supplied to the comparator 54 and is compared with the stored data in the imaginary board memory 53. At this time, naturally, the data address of the imaginary board memory 53 is identical to that of the sensor address counter 52. Consequently, if the Go stone is not put on the Go game board 2, the comparison by the comparator 54 does not generate a signal. But, if no Go stone is put on the Go game board 2 and when the sensor address counter provides an address corresponding to that of the placed Go stone, the digital output from the stone detecting means 3 (stone sensor 14) is not identical to that of the imaginary board memory 53. When this difference occurs, the comparator 54 generates a signal so as to increase the address of the memory address counter 55 and also updates the imaginary board memory 53 by rewriting the stored data corresponding to the appointed address.

Accordingly, a player can learn the stored sequence in the memory 6 by looking at the lighting display LEDs 13 on the periphery of the Go board 2.

In FIG. 6, the controller 5 which is composed of some blocks can be fabricated from digital ICs, of course. But more easily, the controller can be realized by using a microcomputer. In general, a microcomputer has memories, accumulators, and input and output terminals in itself, so that all blocks in the controller 5 can be easily realized by the microcomputer.

Figure 7:
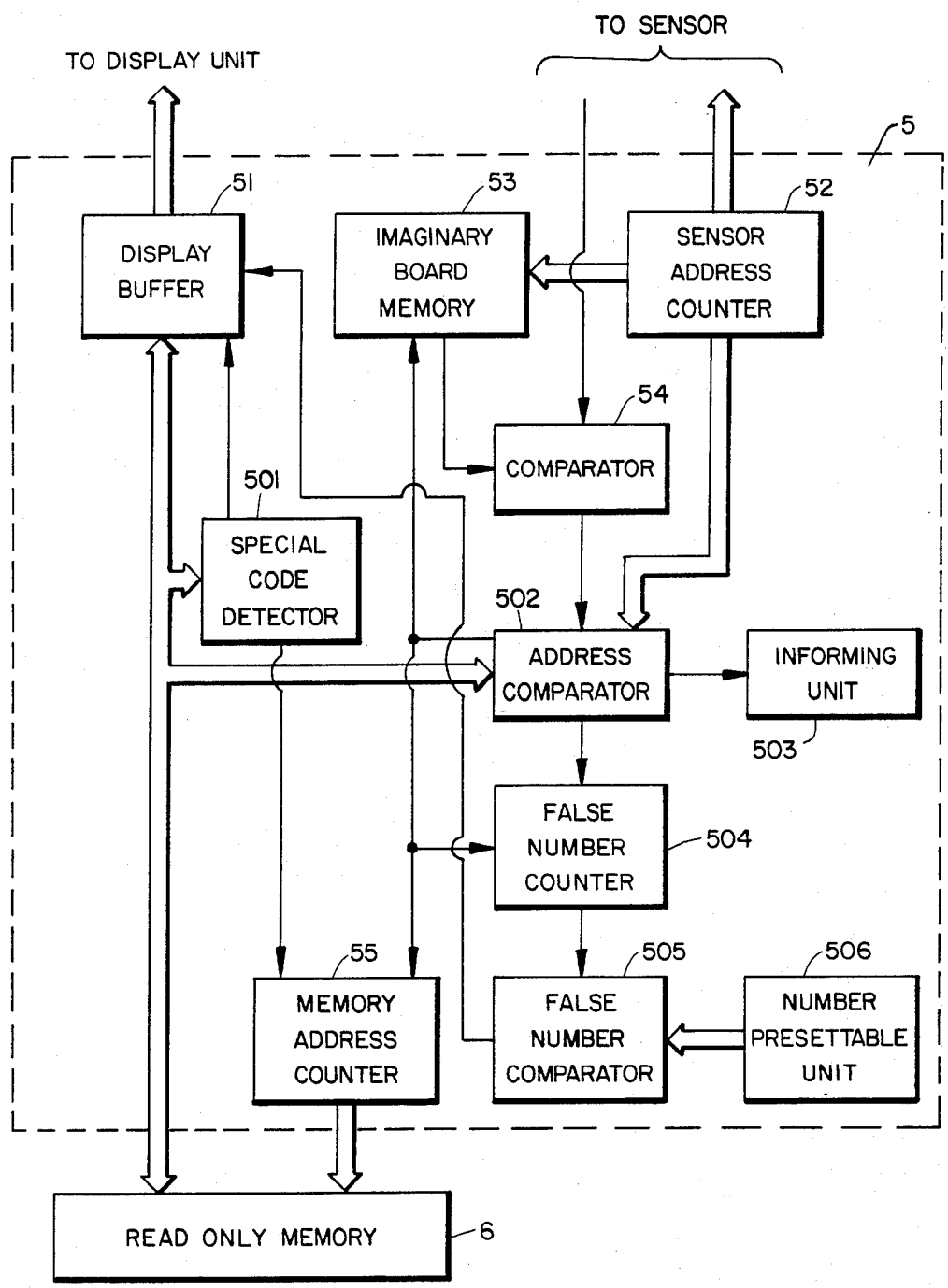
FIG. 7 is a block diagram of another embodiment of a controller and a memory means according to the present invention.

Another embodiment of the present invention is illustrated in FIG. 7. Referring to FIG. 7, the controller 5 and the memory 6 are illustrated. The other components, the Go board, the Go stone, the stone sensor, and the memory are completely the same as those previously mentioned.

In FIG. 7, the units which operate identically to those in FIG. 6 are indicated by the same numbers as in FIG. 6. The memory address counter 55 provides an address for the read only memory 6. The read only memory 6 provides a coded data word corresponding to the address provided from the memory address counter 55. Then the coded data provided from the read only memory 6 is supplied to the display buffer 51 and a special code detector 501. This special code detector 501 distinguishes a special code from the normal code which represents a position on the Go game board 2. In other words, the read only memory 6 stores not only the data which represents positions on the Go game board but also the data which represents special information. This special information is, for example, a sign of a problem or the start of a problem. When the special code detector 501 detects a special code provided from the read only memory 6, the special code detector 501 increments the address of the memory address counter 55 and also disables the display buffer 51. This situation occurs in the case of the game problem. That is, in the case of the game problem, the next position to place the next Go stone is not indicated on the Go game board (by LEDs 13), so that the player try to consider the next move of the next Go stone. When the player put the next Go stone on the Go game board 2, the comparator 54 detects the placement of the stone in the manner as mentioned referring to FIG. 6 and provides a stone detecting signal to an address comparator 502. This address comparator 502 compares the data of the sensor address counter 52 with the coded data from the read only memory 6. And if these two data are identical, the imaginary board memory 53 is rewritten to the latest state of the developments of the game and the address of the memory address counter 55 is increased by the signal from the address comparator 502, and additionally, the result of the identity is informed to the player by an informing unit 503. But if the result of the comparison is not identical, the address comparator 502, instead of the above mentioned operation, increases the false number of a false number counter 504 by the output signal of itself.

The controller 5 further comprises a number presettable unit 506 and a false number comparator 505. In the case that the result of comparison is not identical, the false number of the false number counter 504 is increased, and additionally, the false number of the false number comparator 504 is compared with the preset number preset in the number presettable unit 506, by the false number comparator 505. And when the false number is less than the preset number, the controller 5 does not make any more operations by informing the player that the result is not identical by the informing unit 503. However, if the false number of the false number counter 504 becomes equal to or larger than the preset number of the presettable number unit 506, then the false number comparator provides a signal to the display buffer 51. The display buffer 51 then activates the LEDs 13 so that the player can recognize the correct move of the next Go stone by looking at the lighting LEDs 13.

For example, assuming that the preset number of the presettable number unit is "5", if the player makes errors 5 times, this apparatus informs the player of a correct move by lighting the LEDs on the periphery of the Go game board.

The other operation exists in the controller 5 in FIG. 7 which operation is used for learning the standard orders of developments of Go. In this case, the display LEDs 13 are lighting, so that the player can put a Go stone on the Go game board 2 by looking at it. But, if the player puts a stone on a different position from the indicated position, the address comparator 502 detects the address error. The player is then informed of the error by the informing unit 503. Of course, when the player puts a stone correctly on the indicated position, the memory address counter 55 is increased and the next position is displayed by the LEDs 13 in the same manner as mentioned referring to FIG. 6.

Consequently, the player can place Go stones according to the standard orders without mistakes. Also, the player can enjoy solving Go problems.

Figure 8:
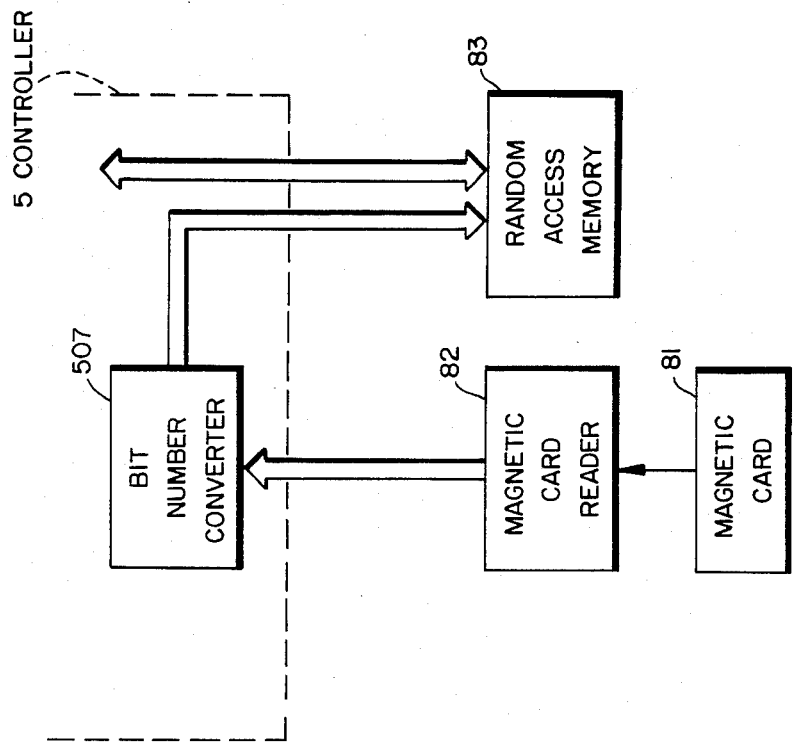
FIG. 8 is a block diagram of another embodiment of a memory means.

The memory 6 can be realized not only by the read only memory but also by other memory means including a magnetic card, a magnetic tape and a magnetic disc. FIG. 8 shows another example of the memory 6. In FIG. 8, a magnetic card 81 is inserted into a magnetic card reader 82. The controller 5 reads out the coded data from the magnetic card reader 82. Since the track number is not equal to the bit number of a random access memory 83, a bit number converter 507 in the controller 5 converts the bit number to the track number. When the insertion of a magnetic card is completed, the entire coded data recorded in the magnetic card 81 is transfered to the random access memory 83. From the data stored in the random access memory 83, the player can learn various Go problems in the manner as described before.

Although specific examples have been described above, it is apparent to those of ordinary skill in the art that various modification may be made without departing from the substantial properties of this invention. The above described specific examples are intended merely to illustrate the various facets in certain selective embodiments of this invention. the scope of which it is intended shall be limited only by following claims.

What is claimed is:

1. A game apparatus comprising:
   a game board on which a player plays a game;
   game pieces for the game;
   a memory means for storing coded data of orders of development of the game or problems of the game;
   a game piece detecting means for detecting a position of a game piece on the game board and for providing a detected signal;
   a display means for displaying the next move of the game piece;
   a control means for controlling said display means to display according to said coded data stored in said memory means when said detecting means detects a move of the game piece;
   wherein said game piece detecting means comprises a plurality of game piece sensors for detecting the game piece and a sensor selecting means for selecting one of said game piece sensors; and
   wherein said control means comprises:
   an imaginary board memory for storing the state of development in the game;
   a sensor address counter for feeding address data to said sensor selecting means and to said imaginary board memory;
   a comparator for comparing said detected signal from said game piece detecting means with an output signal of said imaginary board memory; and
   a memory address counter for feeding memory address data to said memory and incrementing the memory address data when triggered by an output signal from said comparator, said control means causing said display means to display the next coded data in said memory means only when said detected signal and said output signal of said imaginary board memory are equal;
   wherein said control means further comprises:
   an address comparator for comparing the address data from said sensor address counter with said coded data from said memory, said address comparator being triggered by the output of said comparator;
   a false counter for counting up a signal from said address comparator;
   a presettable number means for presetting a specified number; and
   a number comparator for comparing an output of said false counter with the specified number of said presettable number means, said control means causing said display means to display said coded data from said memory means when triggered by an output from said number comparator, whereby said display means displays a position for placing a game piece when the address data from said sensor address counter is equal to the coded data and the output of said false counter is equal to the specified number.

2. A game apparatus according to claim 1, wherein said control means causes said display means to display said coded data from said memory means when said number comparator is fed a larger number which is output from said counter than the specified number of said presettable number means.

3. A game apparatus according to claim 1, wherein said control means further comprises an informing unit which informs said player, by voice or an LED, of the result of a comparison by said address comparator.

4. A game apparatus according to claim 1, 2, or 3 wherein said memory means comprises a magnetic card reader for reading data from a magnetic card.

* * * * *